(12) United States Patent
Epitaux et al.

(10) Patent No.: US 6,603,093 B2
(45) Date of Patent: Aug. 5, 2003

(54) METHOD FOR ALIGNMENT OF OPTICAL COMPONENTS USING LASER WELDING

(75) Inventors: Mark Epitaux, Sunnyvale, CA (US); Robert Kohler, Mountain View, CA (US); Jonas Webjorn, Fremont, CA (US); Jean-Marc Verdiell, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/925,105

(22) Filed: Aug. 8, 2001

(65) Prior Publication Data

US 2003/0029051 A1 Feb. 13, 2003

(51) Int. Cl.[7] .............................................. G01D 21/00
(52) U.S. Cl. .................................................. 219/121.64
(58) Field of Search ................................. 250/239, 216, 250/227.11, 227.24, 227.28, 551; 385/88, 90, 91, 92, 93, 94, 137; 257/433, 678, 703, 704; 219/121.64, 121.63, 121.65, 121.66, 121.82

(56) References Cited

U.S. PATENT DOCUMENTS 5,570,444 A * 10/1996 Janssen et al. ................. 385/90
5,619,609 A * 4/1997 Pan et al. ...................... 385/136
5,641,984 A * 6/1997 Aftergut et al. .............. 257/433
6,207,950 B1 * 3/2001 Verdiell ........................ 250/239

OTHER PUBLICATIONS

Mobarhan, Kamran S., et al. "Laser Diode Packaging Technology:980 nm EDFA Pump Lasers for Telecommunication Applications," Newport, Jun. 28, 2001, pp. 1–7.

* cited by examiner

Primary Examiner—Tom Dunn
Assistant Examiner—Jonathan Johnson
(74) Attorney, Agent, or Firm—Blakely, Sokoloff, Taylor & Zafman LLP (57) ABSTRACT

A method for aligning optical components includes positioning a flexure having an attached first optical component with respect to a substrate having a second optical component attached thereto. The flexure has at least two legs, and each leg has a foot portion. The method further includes coupling at least one leg of the two legs to the substrate at a point of contact between the foot portion of the at least one leg and the substrate. The method further includes adjusting the alignment of the optical components by spot welding a location on the leg. Spot welding on the substrate may also be used to adjust the alignment of the optical components.

43 Claims, 11 Drawing Sheets

METHOD FOR ALIGNMENT OF OPTICAL COMPONENTS USING LASER WELDING

FIELD OF THE INVENTION

The present invention relates generally to optoelectronic assemblies having optical components and methods for making the same; and, more particularly, to a method for aligning optoelectronic components including a diode, an optical fiber, and a flexure mounted on a planar or quasi-planar substrate.

BACKGROUND OF THE INVENTION

Optoelectronics packaging is one of the most difficult and costly operations in optoelectronics manufacturing. Optoelectronic packages provide submicron alignment between optical elements, high-speed electrical connections, excellent heat dissipation, and high reliability. Providing such features has resulted in optoelectronic packages that are larger, costlier and more difficult to manufacture than electronic packages. In addition, current designs of optoelectronic packages and associated fabrication processes are ill adapted for automation because today's high-performance butterfly packages are characterized by a large multiplicity of mechanical parts (submounts, brackets, ferrules, etc.), three-dimensional (3D) alignment requirements, and poor mechanical accessibility.

One type of package for an edge-coupled optoelectronic device includes a cover with a window, so that an optoelectronic device, such as a laser, may be coupled to external optics, such as a lens or an optical fiber. See, for example, U.S. Pat. No. 4,953,006 by Kovatz. Although this type of package can provide hermeticity and high-speed electrical connections, it does not provide for a way to mount and align collimation or coupling optics nor optical fibers.

U.S. Pat. No. 5,005,178 by Kluitmans and Tjassens and U.S. Pat. No. 5,227,646 by Shigeno also disclose packages for optical and optoelectronic components. Kluitmans et al. discuss a package for a laser diode coupled to an optical fiber. The package includes a conducting rod so that the laser may be used at high speed. Shigeno describes a heat sink for cooling an enclosed laser diode, where the laser diode is preferably coupled to an optical fiber. However, in both of the above patents, it is difficult to align the laser diode with the optical fiber when constructing the package. Both designs use numerous parts in complex three dimensional arrangements and are unsuitable for automated assembly. U.S. Pat. No. 5,628,196 by Farmer discloses a package including a heat sink for a semiconductor laser, but provides no efficient means for coupling the laser to other optics.

In most current types of packages, it is difficult to align the laser diode with the optical fiber when constructing the package. The process of aligning an optical fiber to a laser diode and fixing it in place is known as fiber pigtailing. Current designs use numerous parts in complex three-dimensional arrangements and are unsuitable for automated assembly.

The difficulty in alignment during fiber pigtailing is made more problematic where welding is involved in the manufacturing of a package. The result of the welding process causes a shift to occur in the structure being welded due to shrinkage of the molten weld material while it is solidifying. Therefore, even though a component may be aligned prior to welding, the result of the welding process may cause such shifts to occur. Where micron accuracy is needed, these shifts affect the overall yield. Current techniques to reduce the effect of such post weld shifting include pre-compensation for post weld shifting, laser hammering, or "bending" of the parts after welding.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of a method of aligning optical components in an optoelectronic package are disclosed. Attachment of a flexure having a plurality of legs to a frame or substrate can include multiple welds on each leg of the flexure. Fine alignment can also be performed using a technique known as laser hammering. Spot welding with a laser at selected locations on or near a foot portion of a flexure is used to align or realign the optical components by inducing movement in the flexure due to shrinkage forces of the spot weld. Various combinations of factors such as spot weld locations, laser beam energy, repeated welding, and foot geometry can be used to provide a desired adjustment or alignment of the flexure carrying a first optical component with a second optical component in an optoelectronic package.

An exemplary optoelectronic package includes a flexure coupled to one or more optical components in order to support the component(s), as well as align one or more components in the package. The flexure is typically attached (e.g., welded) to a portion of the interior of the package as part of a pick and place mounting method.

In high performance optoelectronic packages, critical optical elements require more precise placement than can be obtained with the combination of platform height control and two-dimensional pick and place. This is the case of single mode fibers, which have to be aligned within less than a micron precision to achieve high optical coupling efficiency. In one embodiment, such components are mounted using a miniature flexure which allows for a small amount of vertical adjustment. In one embodiment, the flexure is made of thin metal that may have been etched or stamped, and then bent in a press. The flexure may comprise of two or more legs which rest on the substrate or on each side of the frame. In one embodiment, the legs are joined by a body that supports or clamps the optical element. Two sections of material having a spring property join the legs to the body.

The flexure may be designed so that in its natural (non-flexed) state, the optical axis of the optical component attached to the body rests slightly above the optical plane of the package. Final adjustment of the height is obtained by applying pressure to the flexure, therefore lowering the body height. Dragging the flexure in the plane parallel to the plane of the substrate may be performed to correct the lateral position. When adequate alignment is reached, the legs are permanently attached to the frame or substrate. The attachment may be by, for example, laser welding, soldering or adhesive bonding. In another refinement of the flexure design, the flexure has more than two legs. The first pair of legs is attached to the frame after coarse optical alignment. The flexure is then finely realigned, using the residual flexibility left after the two first legs are attached. When the optimum or desired position is reached, the remaining legs are attached.

Thus, at least one embodiment of the present invention provides a package for optical components such that the components are easily and precisely aligned within a package. Such a package may be manufactured inexpensively and in an automatable method. Embodiments of the optical package may have advantages in that it may be mass-produced at a low cost while maintaining a precision alignment of the optical components within the package.

Figure 1:
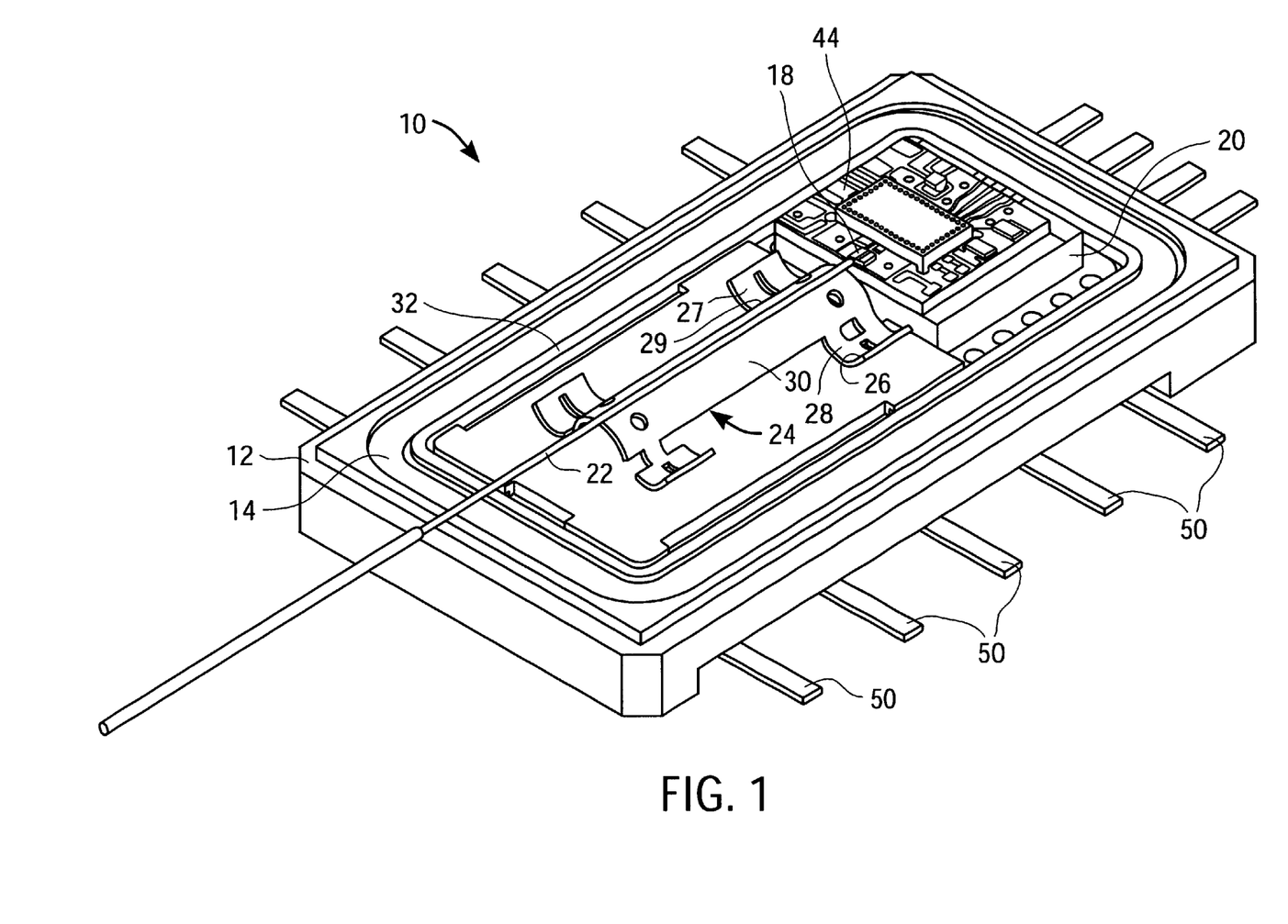
FIG. 1 shows one embodiment of an optoelectronic package assembly.

FIG. 1 shows one embodiment of an optoelectronic assembly 10 with frame 32 and flexure 24. Assembly 10 also includes a substrate 12 with positioning floor 14, which may be substantially planar and the substrate 12 comprises an electrically isolating region with a low coefficient of thermal expansion. In one embodiment, a raised platform is created on positioning floor 14.

In one embodiment, the package comprises a substrate having a positioning floor which provides a mounting surface and the package bottom wall. In one embodiment, the substrate and its positioning floor are substantially planar. In one embodiment, one or more raised platforms are also provided on the mounting surface. The raised platforms may be submounts made of a high thermal conductivity material, such as, for example, copper tungsten, Aluminum Nitride, Berillyum Oxide, Diamond, and Boron Nitride, attached to the floor of the substrate. The raised platforms may be attached, for example, by soldering or brazing, or may even be part of the substrate material itself.

Optical elements, or components, are mounted on positioning floor 14 and platform 20. In one embodiment, a lens (not shown) is mounted on substrate 12, and an edge emitting optoelectronic element 18, such as, for example, a laser diode, is mounted on platform 20. Other optical components may be used. For instance, a receiving opto electronic element 18 such as a photodiode may be used.

An optical element 22 is attached to on flexure 24, by, for example, soldering, brazing or welding. In one embodiment, flexure 24 comprises two legs 26 and 27, a body 30, and two spring regions 28 and 29 at the junction of legs 26 and 27 and body 30. In one embodiment, element 22 is a single mode optical fiber, but it may be any element that requires optical alignment with other optical elements.

A platform or frame 32 may be attached to substrate 12. The ends of legs 26 and 27 are attached to frame 32. Flexure 24 and its attachment method will be discussed in more detail below.

A cap (not shown) may be attached to frame 32, thereby creating an airtight seal. In one embodiment, the cap has a top hat shape and a peripheral lip that can be hermetically sealed to the outside portion of the frame. The hermetic seal may be created by a process such as seam welding, soldering or adhesive bonding.

In one embodiment, a wire bond (not shown) connects optical element 18 to electrically conductive pattern 44 which is on the top side of platform 20 or on a substrate mounted on platform 20. Pins 50 on the bottom side of positioning floor 14 are also provided for connections to electronic component inside the package through other vias (not shown). The combination of patterns and filled vias provide an efficient and low-parasitic mechanism for hermetically distributing electrical signals from optoelectronic elements inside the hermetic enclosure to pins 50 at the periphery of package 10. Alternatively, signals can be distributed to ball grid array underneath the package for surface mounting.

FIGS. 2A–C, 3A–C, 4A and 4B illustrate a flexure alignment device and alignment method. In the embodiments shown in these figures, flexure 24 comprises a body 30 and two legs 26 and 27. This embodiment of a flexure may be replaced by the embodiment shown in FIG. 1. Two spring regions 28 and 29 connect legs 26 and 27 to body 30. The extremities of legs 26 and 27 rest on frame 32. In an alternative design, the extremities of the legs rest directly onto substrate 12. Body 30 holds an optical element 22. In one embodiment, the optical element 22 comprises an optical fiber. In one embodiment, flexure 24 is preferably made from a flat stamped or etched piece of spring steel. Spring regions 28 and 29 can be created by chemically removing half of the metal thickness. Flexure 24, which is substantially flat, is then subsequently formed in a press to shape legs 26 and 27 and spring regions 28 and 29, then annealed at high temperature to confer spring properties to the material. In an alternative embodiment, the material already has spring properties so no annealing is necessary. In one embodiment, flexure 24 is about 170 microns thick, and spring regions 28 and 29 are approximately 85 microns thick. It will be clear from the following how legs 26 and 27, body 30 and spring regions 28 and 29 are designed to allow for precise three-dimensional alignment of optical element 22.

Figure 2A:
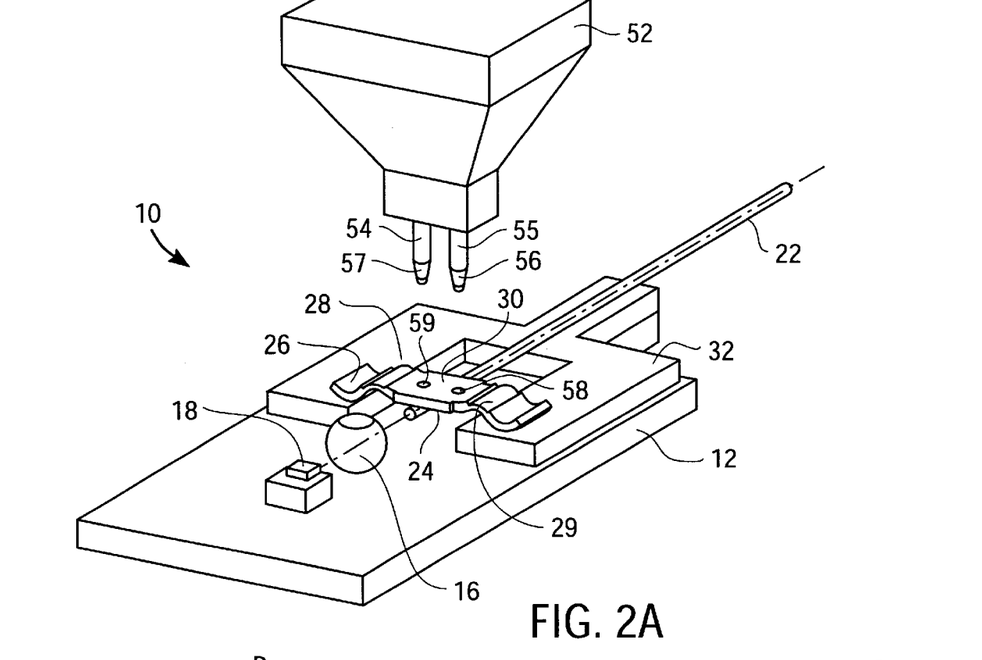
FIG. 2A shows a perspective view of the assembly before alignment of the flexure with a removable positioning tool.
Figure 2B:
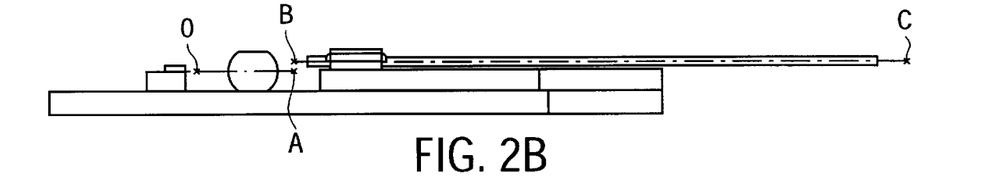
FIG. 2B shows a side view of the assembly before alignment of the flexure.
Figure 2C:
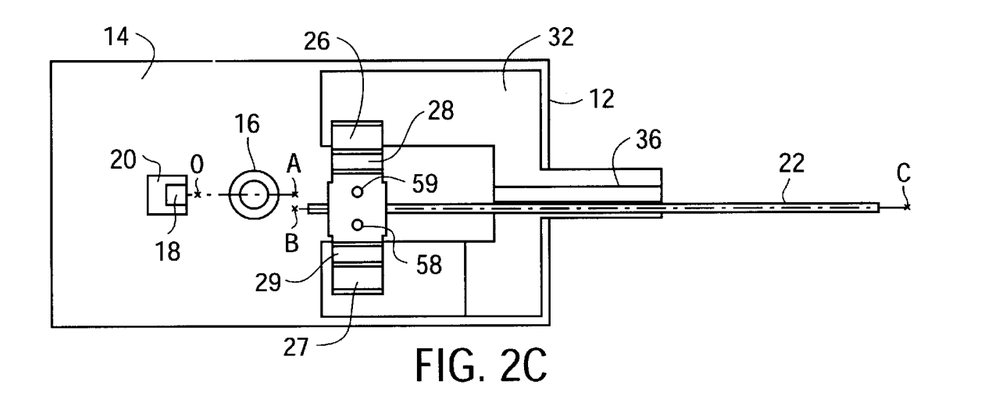
FIG. 2C shows a top view of the assembly before alignment of the flexure.
Figure 3A:
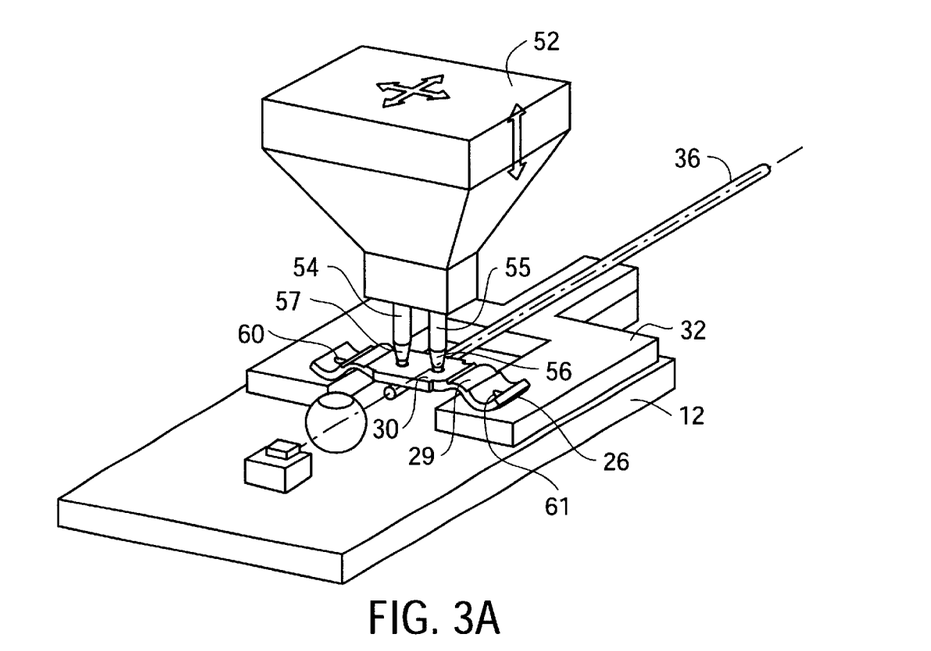
FIG. 3A shows a perspective view of the assembly with the flexure being aligned using the removable positioning tool.
Figure 3B:
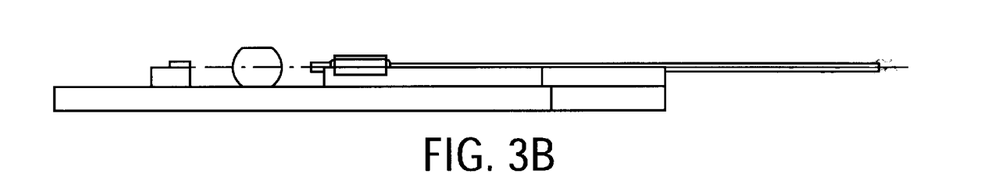
FIG. 3B shows a side view of the assembly after alignment and attachment of the flexure legs.
Figure 3C:
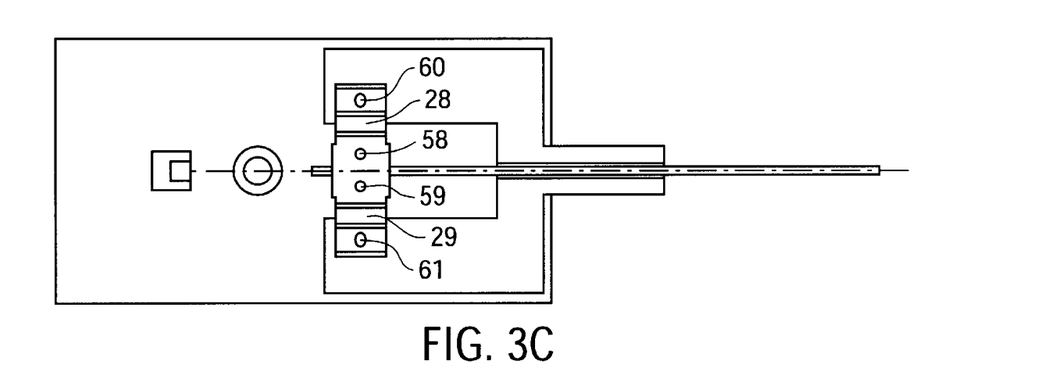
FIG. 3C shows a top view of the assembly after alignment and attachment of the flexure legs.

The process begins by first attaching optical element 22 to body 30 of flexure 24 by a process such as, for instance, soldering or adhesive bonding. Flexure 24 and its attached optical element are then picked and dropped in rough alignment on optical assembly 10 as shown in FIG. 2A. At this point, flexure 24 simply rests on frame 32 (or on substrate 12, in a ring-less embodiment), with no further attachment method. At least one first optical element 16 is already attached on optical assembly 10 and defines an optical axis OA, with respect to which optical element 22 and its optical axis BC will be aligned using flexure 24. In one embodiment, a laser diode 18 and a lens 16 are attached on the optical assembly before flexure 24 is aligned. In one embodiment, flexure 24 is designed such that optical axis BC is higher than optical axis OA, as shown in the side view of assembly 10 on FIG. 2B. In one embodiment, BC is about 100 to 200 microns higher than OA when no pressure is applied on flexure 24. The top view of the assembly in FIG. 2C shows that the axis OA and BC may also be offset from each other in the horizontal plane alignment of flexure 24.

Figure 4A:
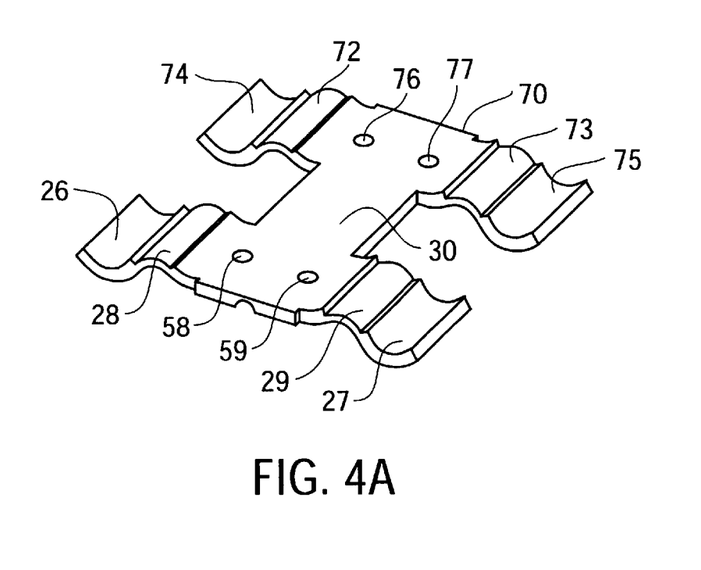
FIG. 4A illustrates one embodiment of a four-legged flexure.

Removable alignment tool 52 is used to apply pressure to the top of body 30. Tool 52 also features pins 55 and 54 with conical ends 56 and 57 which fit into matching gripping holes 58 and 59 on body 30. It should be clear that the shape of the alignment tool in FIGS. 4A and 5B is just given as an example. Other tools that provide the ability to temporarily clamp onto the flexure and apply pressure on body 30 can be designed by one skilled in the art. For example, matching sets of grooves in the flexure and tool can replace the pin and hole interlocking design. A vacuum tool can also be used.

During the fine alignment step, tool 52 is lowered onto body 30. Conical tips 56 and 57 are tightly fitted in holes 58 and 59. The tool applies pressure on body 30, causing spring regions 28 and 29 to bend under the pressure. This, in turn, causes legs 26 and 27 to spread apart and axis BC to lower into alignment to axis OA, as shown on FIG. 3B. Tool 52 is also moved in a plane parallel to the plane of mounting floor 14, dragging flexure 24 and legs 26 along with it until horizontal and longitudinal alignment of axis OA and BC is obtained, as can be see in the top view of FIG. 3C. In one embodiment, alignment is monitored by measuring coupled power at the output of the fiber while laser 18 is powered up and flexure 24 undergoes fine alignment. In another embodiment, alignment is monitored by measuring coupled power at the output of a photodiode (in the case of the photodiode being the receiving optoelectronic component 18) while the fiber is powered up and emitting a beam into the photodiode.

Once desired alignment is obtained, the leg extremities are attached to the ring frame 32 or substrate 12. One attachment process is laser microwelding through laser beam 62, which creates welding spots 60 and 61. Welding spots permanently attach metallic legs 26 to metallic ring frame 32. Other attachment processes may also be used, such as UV curable adhesives, epoxies, or soldering. After final attachment of the legs is complete, tool 52 is raised from the assembly, leaving the aligned assembly shown in FIGS. 3B and 3C.

Most attachment processes induce minute, undesirable shift or drift during the attachment operation. In the case of adhesives, shift is typically caused by the shrinkage of the adhesive; in the case of soldering, shift is caused by the change of solder volume during the solidification phase and by the expansion and contraction of parts during the temperature cycle; in laser welding, a post-weld shift is usually observed.

Figure 4B:
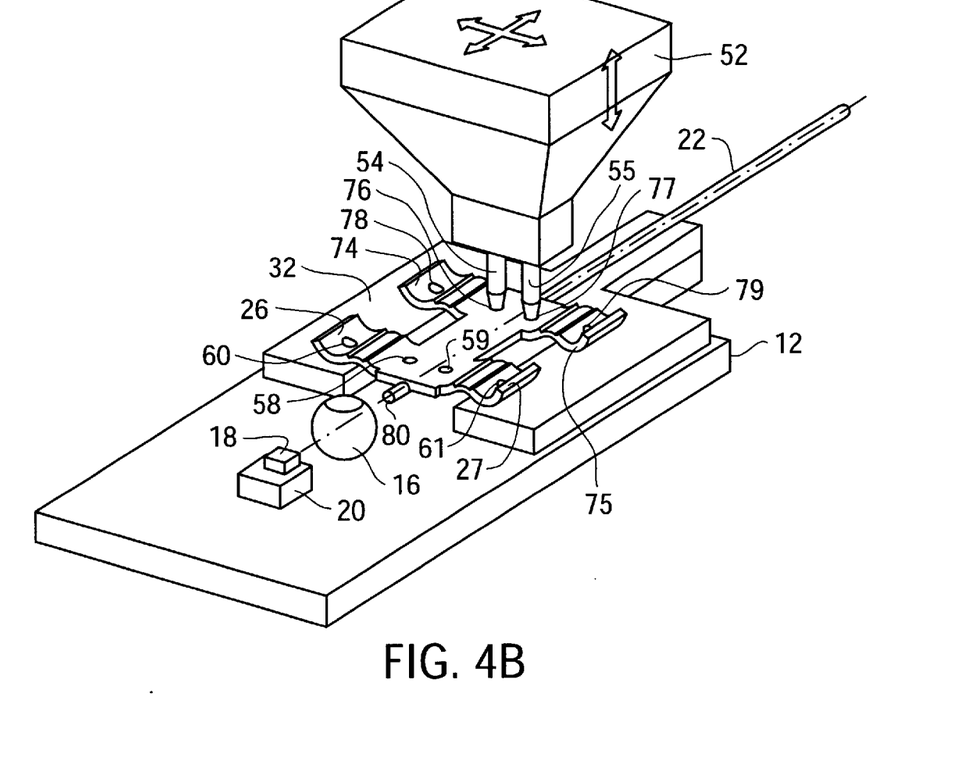
FIG. 4B shows the fine alignment step using the back legs of a four-legged flexure.

FIG. 4A shows one flexure embodiment that reduces, or even minimizes, the effect of such shifts and allows greater alignment precision and reproducibility. Flexure 70 of FIG. 4A comprises two pairs of legs, a front pair of legs 26 and 27 and a rear pair of legs 74 and 75. The front pair of legs is located close to optical element 16 as shown in FIG. 4B, and is aligned using tool 52 and gripping holes 58 and 59 and following the previously described method. An alternate embodiment of tool 52 includes four pins, such as pins 54 and 55 shown in FIG. 4B. Tool 52 having four pins can engage a flexure such as the flexure 70 of FIG. 4A at four gripping holes 58, 59, 76, and 77 simultaneously.

Front legs 26 and 27 are permanently attached to frame 32 as previously described, using for example laser welding spots 60 and 61. Post-attachment shift is corrected in a second alignment step by using tool 52 and rear gripping holes 76 and 77 located in proximity of the rear pair of legs 74 and 75. The residual flexibility of flexure 70 allows a small positioning correction of tip 80 of optical element 22 by moving rear of flexure 70 with tool 52. After second alignment, rear legs are attached to frame 32 by laser welding spots 78 and 79. Alignment tool 52 is then lifted from assembly.

The optimal coupled power position can be determined by providing power to one of the first and second optical components, measuring the coupled power at an output of one of the first and second optical components, and monitoring the measured coupled power during positioning of the flexure to determine the flexure position at which maximum coupled power is measured.

Once the front legs are attached, the flexure can be re-aligned by moving the flexure to adjust the alignment of the first optical component with the second optical component. The same process can be uses to provide strain relief and to compensate for post-attachment shift before the rear legs 74 and 75 are attached.

A process commonly referred to as "laser hammering" can also be used to align the optical components. Laser hammering takes advantage of the shrinkage forces that result from spot welding with lasers to move the flexure and the fiber or optical component attached to the flexure. Laser hammering can be used to move the flexure after the initial attachment of the flexure to the substrate by selecting the locations of the spot welds and the intensity of the laser to induce desired movements in the flexure.

Figure 5:
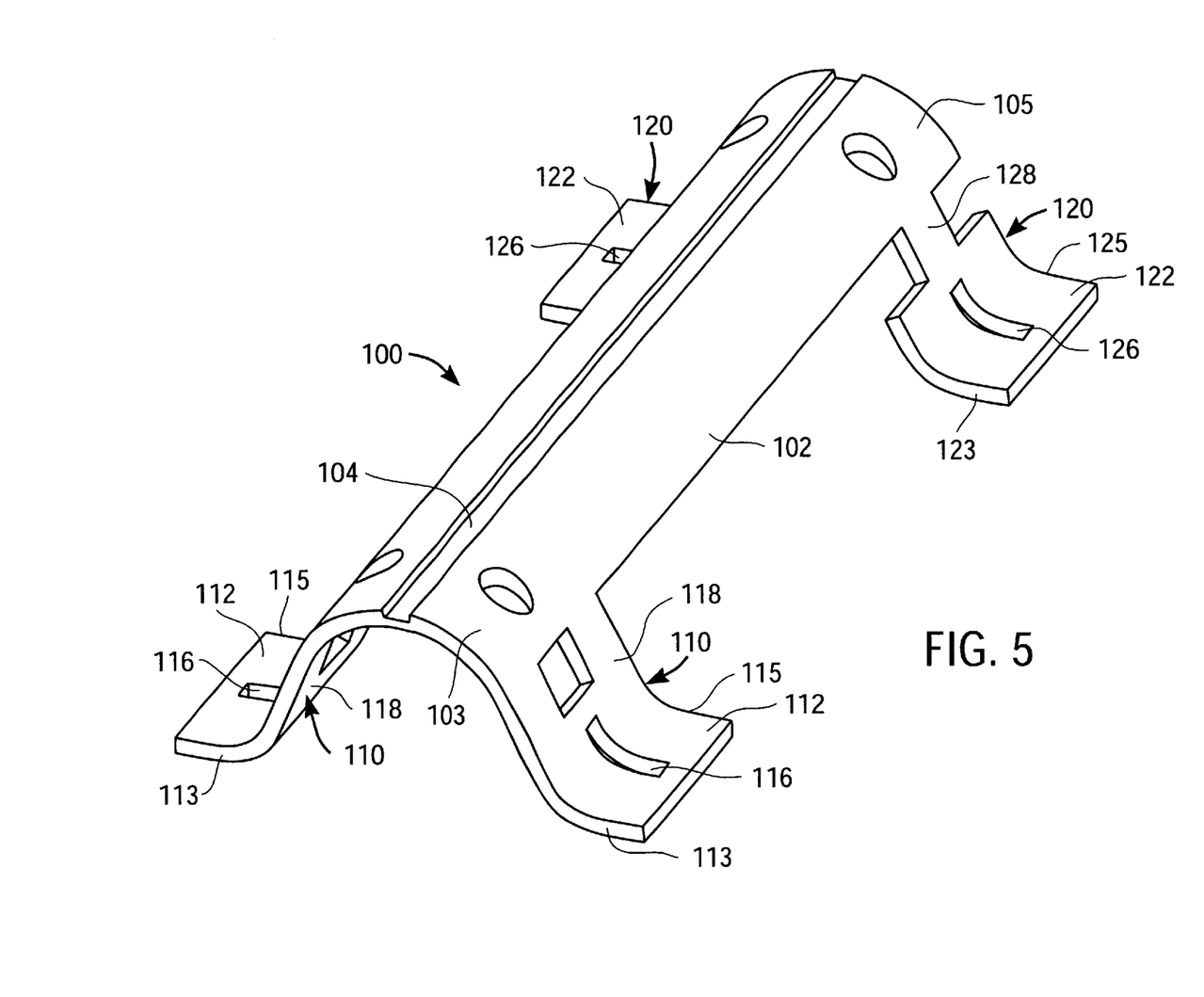
FIG. 5 shows one embodiment of a flexure.

FIG. 5 shows an exemplary flexure 100 that may be used in an optoelectronic package and on which the alignment or realignment method described herein may be performed. Flexure 100 includes a body 102. In the exemplary flexure 100 shown in FIG. 5, body 102 is an elongated, curved member, similar to a partial, longitudinal section of a tube. Body 102 defines an optical component mounting location 104 on its top side. As shown in FIG. 5, mounting location 104 is a centrally located, elongated groove that extends along the length of body 102. Pairs of front legs 110 and rear legs 120 extend from respective front and rear ends 103 and 105 of the elongated body 102. Front legs 110 extend from opposite sides of the front end 103 of body 102, and rear legs 120 extend from opposite sides of the rear end 105 of body 102.

Front legs 110 include foot portions 112, and rear legs 120 include foot portions 122. Upwardly extending portions 118 extend between body 102 and foot portions 112 to form front legs 110. Upwardly extending portions 128 extend between body 102 and foot portions 122 to form rear legs 120. Foot portions 112 define apertures 116, and foot portions 122 define apertures 126. Each foot portion 112 defines a front edge 113 and a back edge 115. Likewise, each foot portion 122 on the rear legs 120 defines a front edge 123 and rear edge 125.

Figure 6:
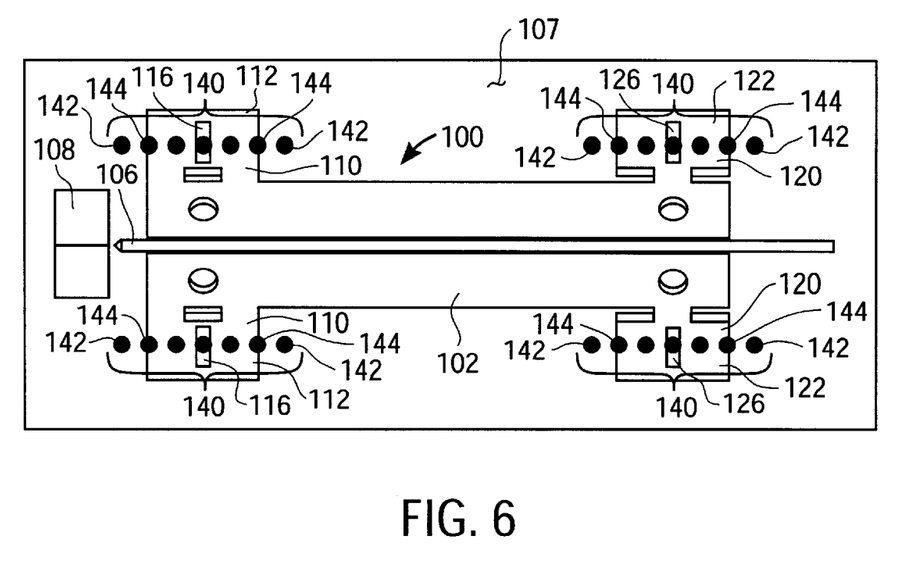
FIG. 6 shows one embodiment of a flexure and spot weld locations.

FIG. 6 shows a top view of the flexure 100 carrying a first optical component 106 to be aligned with a second optical component 108. Spot weld locations 140 are shown on the front legs 110 and the rear legs 120 of flexure 100. In the embodiment shown in FIG. 6, the spot weld locations 140 associated with each leg are aligned with a line of contact between each leg 110 and 120 of flexure 100 and the substrate 107. The line of contact may be a tangent line in the case of a curved foot portion resting on a flat substrate or simply any line selected in a plane of contact between the flexure and the substrate or frame. It should be noted that the flexure can be mounted on a substrate or a frame, as described above. For simplicity of description, substrate and frame are interchangeable terms.

As described above, one embodiment of a method for aligning optical components includes coupling the legs of the flexure to the substrate at a point of contact between the foot portion 112 or 122 and the substrate 107. The coupling can be accomplished with a spot weld, for example. The method further includes adjusting the alignment of the optical components 106 and 108 by spot welding at a selected location on at least one of legs of the flexure 100.

In the example shown in FIG. 6, any of the spot weld locations 140 can be either a coupling location or an alignment adjusting spot weld location. The embodiment of the flexure 100 shown in FIG. 6 includes foot portions 112 and 122 that define apertures 116 and 126 at which one of the multiple spot weld locations 140 associated with each respective leg is located.

FIG. 6 also shows spot weld locations of a leg adjacent the aperture defined by each leg. Also, FIG. 6 shows spot weld locations 142 that are on the substrate 107. Spot weld locations 142 are off the legs 110 and 120, yet are aligned with the line of contact between each leg of the flexure and the substrate. FIG. 6 also shows spot weld locations 144 on the edges of the foot portions 112 and 122 such that a spot weld is formed partially on the leg and partially on the substrate 170.

Figure 7:
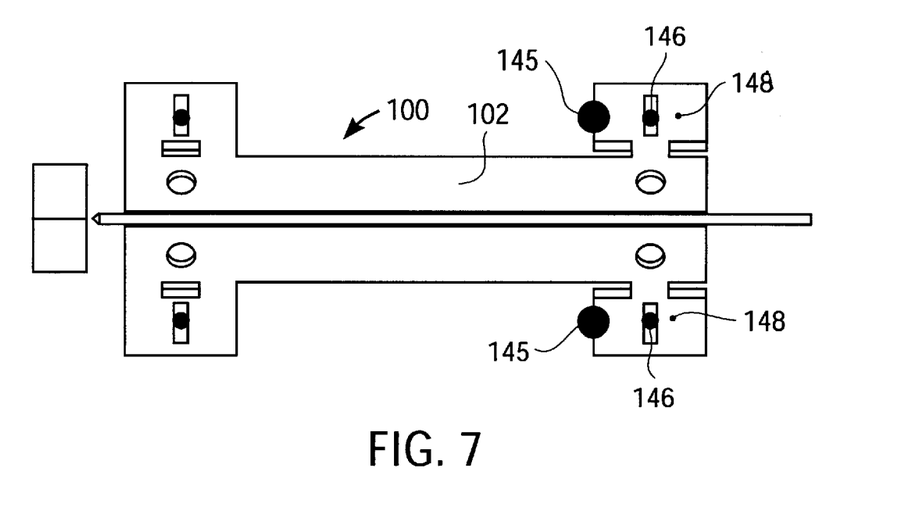
FIG. 7 shows another embodiment of a flexure and spot weld locations.

In one embodiment, the spot welding described herein is performed with a laser beam. An exemplary type of laser beam that may be used is a YAG laser. As illustrated in FIG. 7, the amount of energy of the laser beam may be varied for each spot weld location. For example, spot weld location 145 is formed by a laser beam with an increased energy level resulting in a larger spot weld. In contrast, spot welds at locations 146 and 148 are formed with laser beams at decreased energy levels resulting in relatively smaller spot welds. As shown in FIG. 7, the amount of energy in the laser beam can be varied for each spot weld location. Also, spot welding can be performed more than once at any given location. For example, spot weld location 145 can be formed by repeated pulsing of the laser beam.

In the exemplary embodiment of FIGS. 6 and 7, the flexure 100 includes two pairs of legs extending from opposite sides of the flexure body 102. The method of aligning the optical components may further included spot welding each opposing pair of legs at one end of the body 102 simultaneously.

The method of aligning optical components may further included assessing the alignment of the optical components after a first spot weld and adjusting the alignment with a second spot weld after assessing the alignment by measuring the power or current with a photodiode. This method may be used to provide the initial alignment of the optical components of the optoelectronic package or may be used to rework a package assembly in the event that the optical components have become misaligned. In one embodiment, the method may further include detecting a misalignment of the optical axes of the optical components and spot welding at an additional location on one of the legs or pairs of legs to take advantage of the shrinkage forces of the solidifying weld material to move the flexure, thereby realigning the optical components. In other embodiments, the method may include spot welding on the pair of legs at either end of the flexure if a misalignment of the optical axes is detected during assessing of the spot welding at the opposite end of the flexure.

Figure 8A:
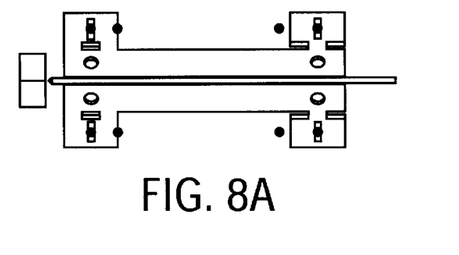
FIGS. 8A through 8T show additional embodiments of flexures and spot weld locations.
Figure 8B:
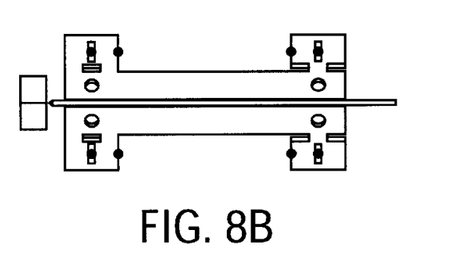
Figure 8C:
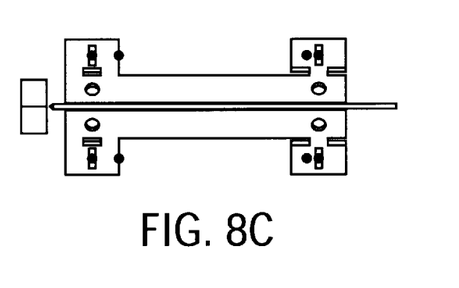
Figure 8D:
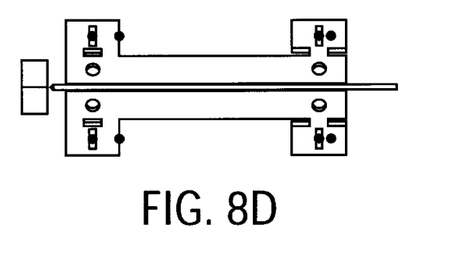
Figure 8E:
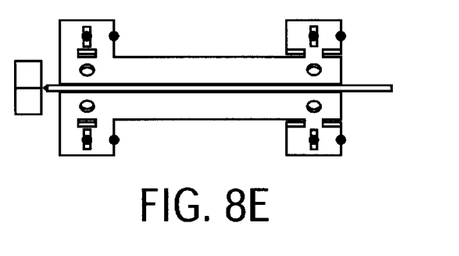
Figure 8F:
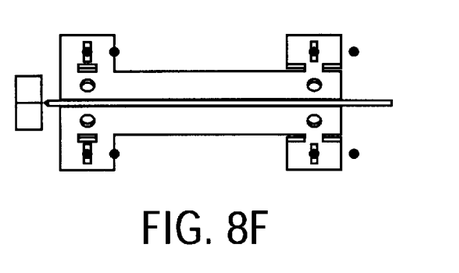
Figure 8G:
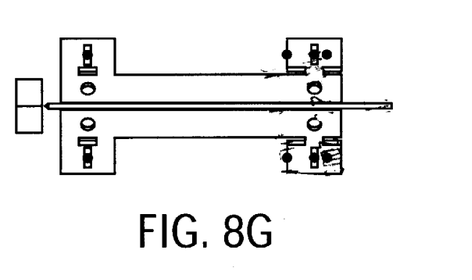
Figure 8H:
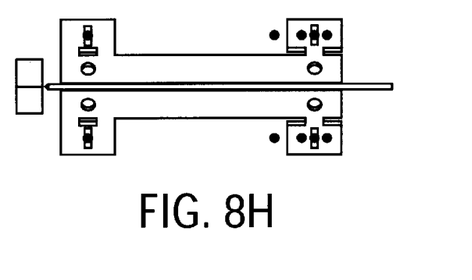
Figure 8I:
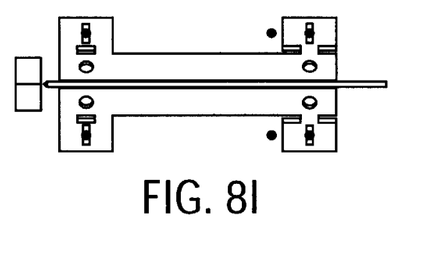
Figure 8J:
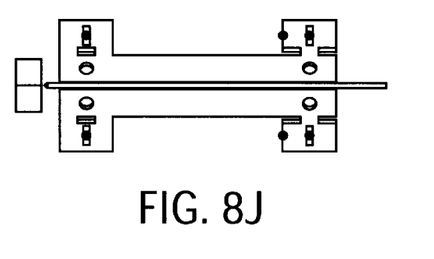
Figure 8K:
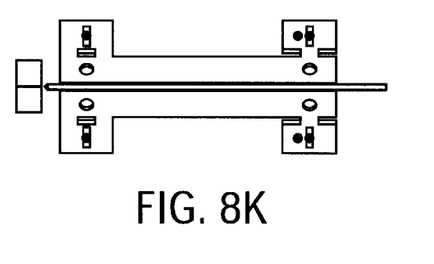
Figure 8L:
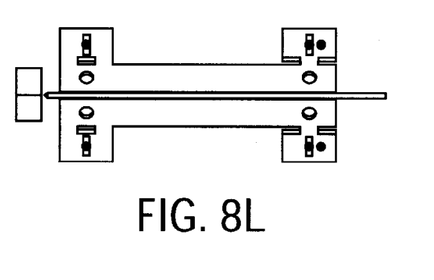
Figure 8M:
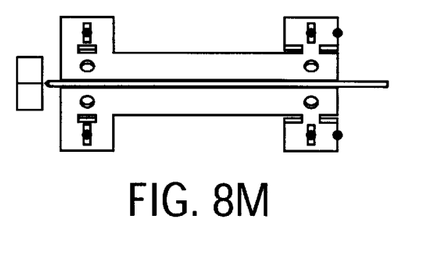
Figure 8N:
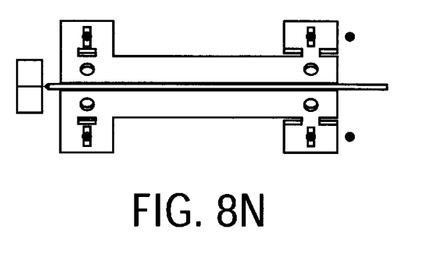
Figure 8O:
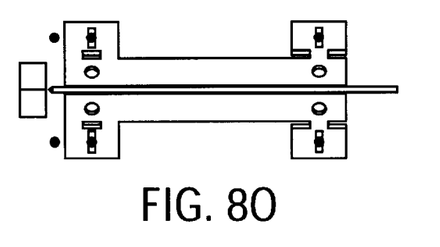
Figure 8P:
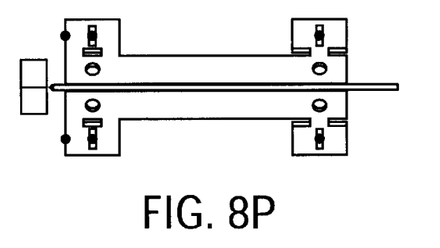
Figure 8Q:
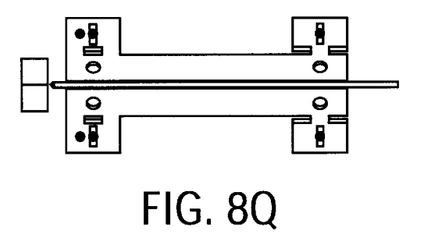
Figure 8R:
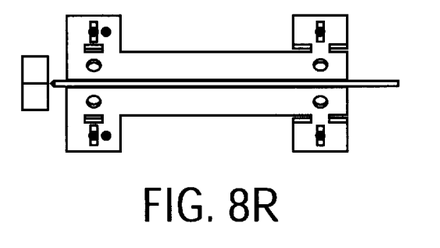
Figure 8S:
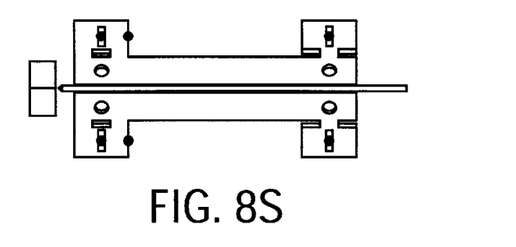
Figure 8T:
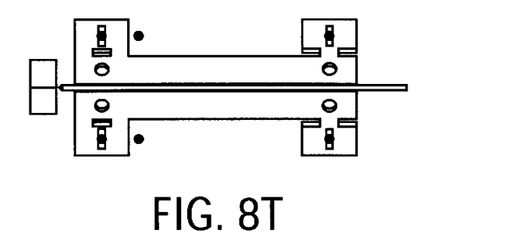

FIGS. 8A through 8T show various embodiments of the method described herein. A number of combinations of spot weld locations are illustrated. The various spot weld locations may be selected to achieve a particular direction of adjustment during alignment or realigning of the optical components.

Figure 9:
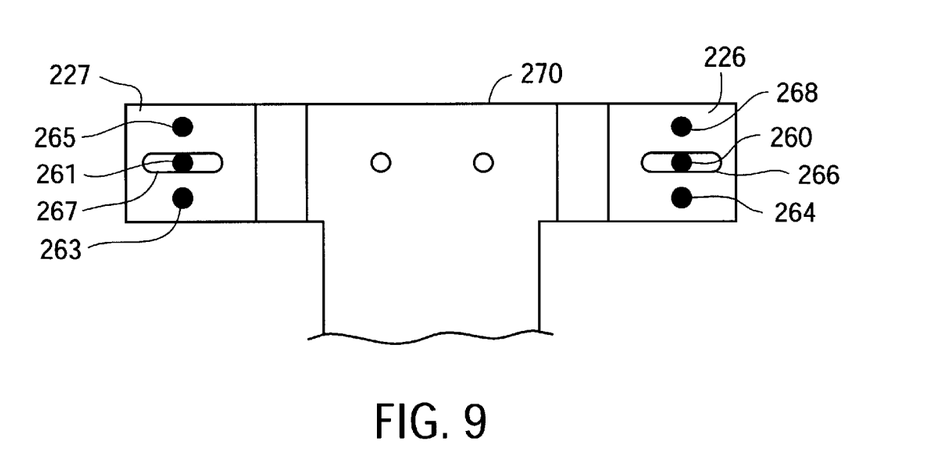
FIG. 9 shows attachment locations on front legs of one embodiment of a flexure.

FIG. 9 shows one embodiment of a method of aligning or realigning optical components. Flexure 270 has legs 226 and 227 extending from either side of flexure 270. Legs 226 and 227 define apertures 266 and 267, respectively. As shown in FIG. 9, spot weld locations 260, 264, and 268 are positioned on leg 226 and spot weld locations 261, 263, and 265 are positioned on leg 227. Locations 260 and 261 are at the apertures 266 and 267, respectively. In one embodiment, spot welds can be placed at locations 260 and 261 to initially attach legs 226 and 227 to the substrate. Additional spot welds can be place at locations 64 and 68 on leg 26 and at locations 263 and 265 on leg 227 to align or realign the optical components by inducing movement of the flexure due to solidification forces of the weld material.

Figure 10:
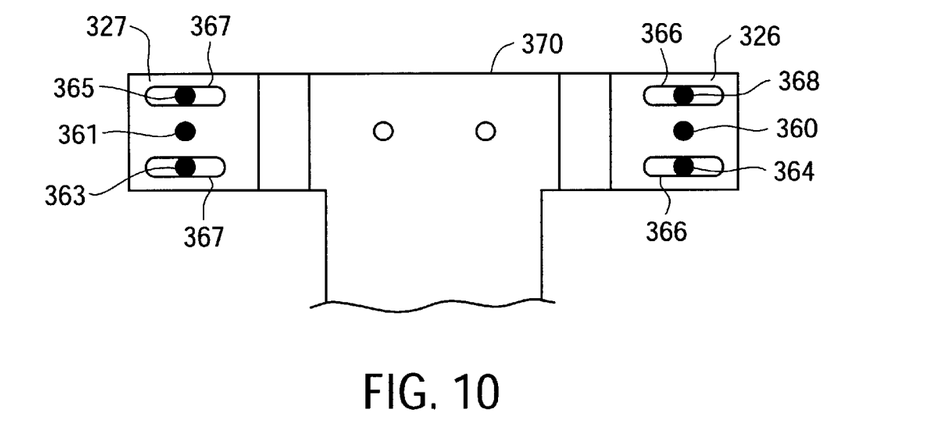
FIG. 10 shows attachment locations on front legs of one embodiment of a flexure.

FIG. 10 shows one embodiment of a method for aligning or realigning optical components. Flexure 370 has legs 326 and 327 extending from either side of flexure 370. Legs 326 and 327 define pairs of apertures 366 and 367, respectively. As shown in FIG. 10, spot weld locations 360, 364, and 368 are positioned on leg 326 and spot weld locations 361, 363, and 365 are positioned on leg 327. Locations 360 and 361 are between the pairs of apertures 366 and 367, respectively. In one embodiment, spot welds can be placed at locations 360 and 361 to initially attach legs 326 and 327 to the substrate. Additional spot welds can be place at locations 364 and 368 on leg 326 and at locations 63 and 365 on leg 327 to align or realign the optical components by inducing movement of the flexure due to solidification forces of the weld material.

In the examples shown in FIGS. 9 and 10, the spot welds are preferably formed simultaneously on both legs of each pair of legs.

Figure 11:
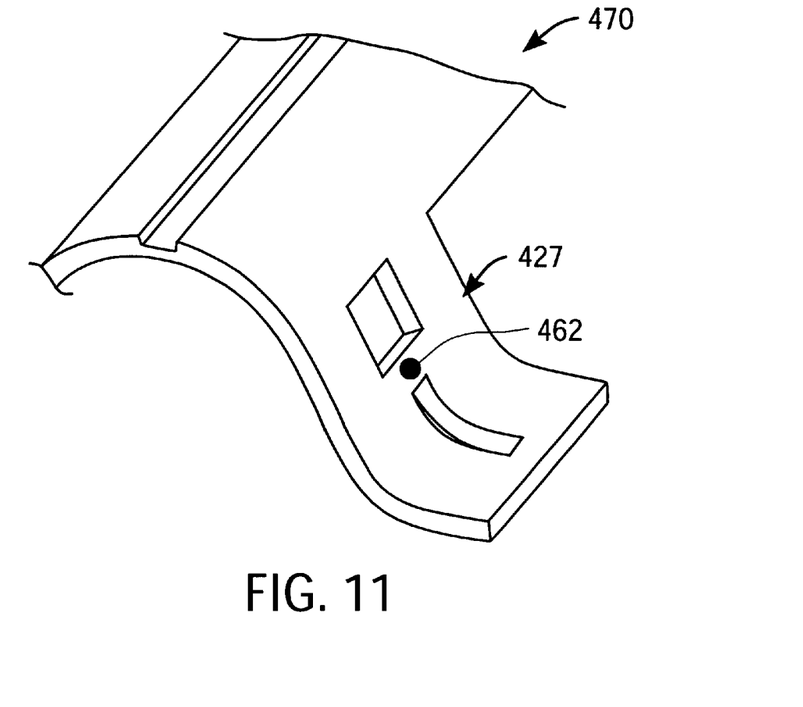
FIG. 11 shows a leg of a flexure with a weld spot.

FIG. 11 shows another embodiment of a method for aligning optical components in which laser hammering is used to adjust the alignment of flexure 470. A weld spot 462 can be placed on leg 427 at a location on the portion of the leg that extends upwardly from the attachment location that is in contact with the substrate or frame surface to which the leg 427 is attached. The upwardly extending portion of the leg extends between the extremity of the leg that rests on the frame and the body of the flexure. During cooling of the spot weld, leg material will be pulled into the shrinking weld pool, thus contracting the leg and moving the body of the flexure.

Figure 12:
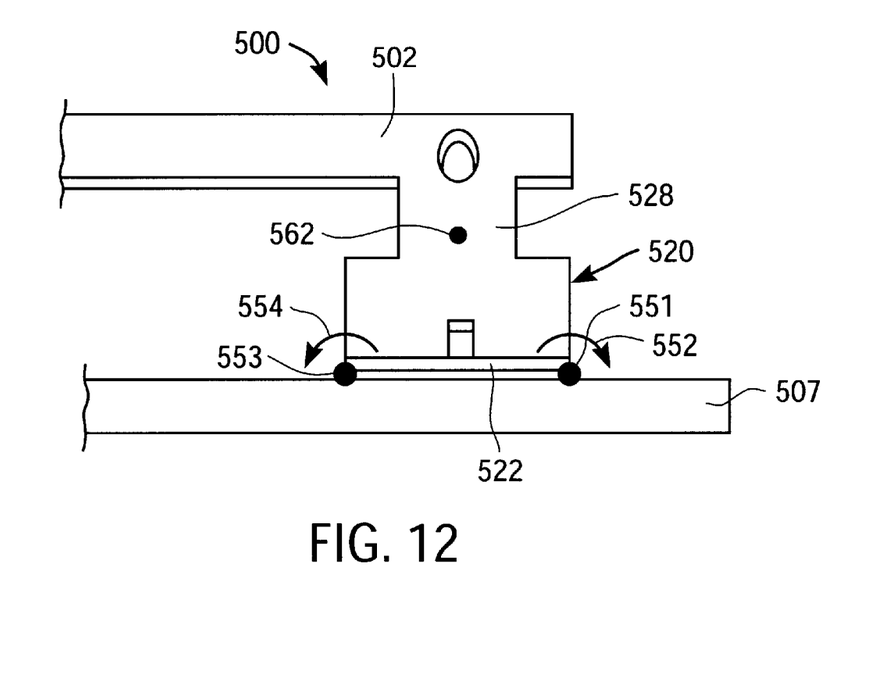

FIG. 12 shows an embodiment of a flexure 500 including exemplary spot weld locations to illustrate the mechanism by which the flexure is adjusted or moved due to the shrinkage forces resulting from laser hammering. Leg 520 of flexure 500 is shown coupled to substrate 507. Spot welds 551 and 553 are shown at the edges of foot portion 522 of leg 520. Arrow 552 indicates the direction of movement of flexure 500 with respect to spot weld location 551. Likewise, arrow 554 indicates the direction of movement of flexure 500 with respect to spot weld location 553. Spot welds 551 and 553 are positioned at points such that the upwardly extending leg 520 pivots around spot welds 551 and 553.

Spot weld 562 may be provided at a location on the upwardly extending portion 528 of leg 520. The shrinkage of the material in the weld pool of spot weld 562 may cause movement of the flexure, especially when the foot portion 522 of the leg 520 is attached to the substrate 507.

The mechanical system described herein may be used for aligning other precision parts having a similar alignment tolerances, such as magnetic recording heads, MEMs, and medical equipment, etc.

Whereas many alterations and modifications of the present invention will become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims.

What is claimed is:

1. A method for aligning optical components, the method comprising:
   positioning a flexure having an attached first optical component with respect to a substrate having a second optical component attached thereto, the flexure having at least two legs, each leg having a foot portion;
   coupling at least one leg of the two legs to the substrate at a point of contact between the foot portion of the at least one leg and the substrate; and
   adjusting the alignment of the optical components by spot welding at least one location on the leg.

2. The method of claim 1 further comprising assessing the alignment of the optical components after a first spot weld, and adjusting the alignment with a second spot weld after assessing the alignment.

3. The method of claim 1 wherein the spot welding location is aligned with a line of contact between the flexure and the substrate.

4. The method of claim 1 wherein the spot welding location is at an aperture defined by the leg.

5. The method of claim 4 further comprising spot welding at an additional location on the leg, the additional location being adjacent the aperture defined by the leg.

6. The method of claim 5 further comprising spot welding on the substrate adjacent the leg at a location aligned with the line of contact.

7. The method of claim 1 wherein spot welding is performed more than once at one of the locations.

8. The method of claim 1 wherein the flexure includes a body and at least two legs extending from opposite sides of the body, and wherein adjusting the adjustment of optical components includes spot welding both legs simultaneously.

9. The method of claim 1 wherein the at least one leg defines two apertures and further comprising spot welding at the two apertures and between the two apertures.

10. The method of claim 1 further comprising spot welding at least two locations on the at least one leg by first spot welding at an aperture on the at least one leg and then spot welding at an additional location next to the aperture.

11. The method of claim 10 further comprising spot welding at a third location next to the aperture.

12. The method of claim 1 wherein spot welding the at least one leg at more than one location is performed by spot welding between two apertures on the at least one leg and spot welding at least one of the apertures on the leg.

13. The method of claim 1 further comprising adjusting the alignment of the optical components by spot welding at a location on an upwardly extending portion of at least one leg of the two legs.

14. A method for aligning optical components, the method comprising:
    positioning a flexure having an attached first optical component with respect to a substrate with a second optical component attached thereto, the flexure having at least two legs;
    moving the flexure until optical axes of the first and second optical components are aligned;
    coupling a first plurality of legs at a first end of the flexure to the substrate by spot welding at least one location on each leg of the first plurality of legs at the first end of the flexure;
    moving the flexure to adjust the optical alignment between the first and second optical components; and
    coupling a second plurality of legs at a second end of the flexure to the substrate.

15. The method of claim 14 further comprising assessing the spot welding on each leg of the first plurality of legs.

16. The method of claim 15 further comprising detecting a misalignment of the optical axes and spot welding at an additional location on at least one of the first and second pluralities of legs.

17. The method of claim 15 wherein coupling a second plurality of legs at the second end of the flexure to the substrate is performed after assessing the spot welding on each leg of the first plurality of legs.

18. The method of claim 17 wherein coupling the second plurality of legs includes spot welding at least one location on each leg of the second plurality of legs, and further comprising assessing the spot welding on each leg of the second plurality of legs and spot welding at an additional location on the second plurality of legs if a misalignment of the optical axes is detected during assessing of the spot welding.

19. The method of claim 14 wherein coupling a first plurality of legs at a first end of the flexure to the substrate by spot welding at least one location on each leg of the first plurality of legs at the first end of the flexure includes spot welding at an aperture defined by each leg.

20. The method of claim 19 further comprising spot welding at a location adjacent the aperture defined by the leg.

21. The method of claim 14 wherein each leg of the first plurality of legs defines two apertures and further comprising spot welding at the two apertures and between the two apertures.

22. The method of claim 14 further comprising spot welding at least two locations on each leg by first spot welding at an aperture on each leg and then spot welding at an additional location next to the aperture.

23. The method of claim 22 further comprising spot welding at a third location next to the aperture.

24. The method of claim 14 wherein spot welding at two locations on the leg is performed by spot welding between two apertures on the leg and spot welding at least one of the apertures on the leg.

25. The method of claim 14 further comprising adjusting the alignment of the optical components by spot welding at a location on an upwardly extending portion of at least one of the two legs.

26. The method of claim 14 further comprising attaching a frame to the substrate and attaching the flexure to the frame.

27. The method of claim 14 wherein the at least one location of spot welding on each leg of the first plurality of legs at the first end of the flexure is on a point of contact between the flexure and the substrate.

28. The method of claim 14 wherein each leg of the first plurality of legs and the second plurality of legs includes a foot portion having a front edge and a back edge, and further comprising adjusting the alignment of the optical components by spot welding at least one front or back edge of at least one leg such that a spot weld is formed partially on the leg and partially on the substrate.

29. The method of claim 28 further comprising spot welding on both the front edge and the back edge of at least one foot portion and spot welding on the at least one foot portion between the front and back edges.

30. The method of claim 29 wherein all spot welding locations are aligned with a line of contact between the foot portion and the substrate.

31. The method of claim 14 further comprising spot welding on the substrate at a location adjacent to at least one leg of the first or second pluralities of legs.

32. The method of claim 14 wherein spot welding is performed more than once at one of the locations.

33. The method of claim 14 wherein the flexure includes a body, at least two legs extending from opposite sides of the body, and wherein coupling at least one leg of the two legs to the substrate includes spot welding both legs simultaneously.

34. A method for realigning optical components, the method comprising:
providing a flexure having an attached first optical component, the flexure having a body and at least two legs extending from opposite sides of the body, each leg having a foot portion, the flexure being mounted on a substrate, wherein the foot portion of each leg is spot welded to the substrate; and
realigning the first optical component with a second optical component by spot welding at a selected location on a line of contact between the flexure and the substrate.

35. The method of claim 34 wherein at least one realigning spot weld location is at an aperture defined by one of the foot portions.

36. The method of claim 35 wherein another realigning spot weld location is adjacent the aperture and aligned with the line of contact between the flexure and the substrate.

37. The method of claim 34 wherein the realigning spot weld location is on the substrate adjacent to one of the foot portions.

38. The method of claim 34 wherein to realigning the first optical component with the second optical component further comprises spot welding at a plurality of locations.

39. The method of claim 38 wherein the plurality of locations is on the flexure.

40. The method of claim 38 wherein the plurality of locations is on the flexure and on the substrate.

41. The method of claim 34 wherein realigning the first optical component with the second optical component by spot welding is performed by spot welding two locations simultaneously, the two locations being on opposite sides of the body.

42. The method of claim 41 wherein spot welding is performed multiple times at one location.

43. The method of claim 41 wherein spot welding is performed at multiple locations and at a different power level at each location.

* * * * *

UNITED STATES PATENT AND TRADEMARK OFFICE
CERTIFICATE OF CORRECTION

PATENT NO. : 6,603,093 B2  Page 1 of 1
DATED : August 5, 2003
INVENTOR(S) : Epitaux et al.

It is certified that error appears in the above-identified patent and that said Letters Patent is hereby corrected as shown below:

Title page,
Item [75], Inventors, delete "Mark", insert -- Marc --.

Signed and Sealed this

Eleventh Day of November, 2003

JAMES E. ROGAN
*Director of the United States Patent and Trademark Office*